(12) United States Patent
Sutton

(10) Patent No.: US 6,249,781 B1
(45) Date of Patent: *Jun. 19, 2001

(54) METHOD AND APPARATUS FOR MACHINE LEARNING

(75) Inventor: Richard S. Sutton, Stow, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/305,575

(22) Filed: May 5, 1999

Related U.S. Application Data

(63) Continuation of application No. 07/979,139, filed on Nov. 20, 1992, now Pat. No. 5,946,675, which is a continuation-in-part of application No. 07/947,213, filed on Sep. 18, 1992, now abandoned.

(51) Int. Cl.$^7$ .................................................. G06N 03/02
(52) U.S. Cl. ............................... 706/25; 706/21; 706/23; 706/27
(58) Field of Search ................................. 706/25, 21, 23, 706/27

(56) References Cited

U.S. PATENT DOCUMENTS

| | | | |
|---|---|---|---|
| 4,933,872 | | 6/1990 | Vandenburg et al. ............... 395/22 |
| 5,092,343 | | 3/1992 | Spitzer et al. ....................... 395/22 |
| 5,181,171 | | 1/1993 | McCormack et al. .............. 395/22 |
| 5,214,746 | * | 5/1993 | Fogel et al. ......................... 706/25 |
| 5,220,640 | | 6/1993 | Frank .................................. 395/22 |
| 5,255,348 | * | 10/1993 | Nenov ................................. 706/27 |
| 5,446,829 | * | 8/1995 | Wang et al. ......................... 706/21 |
| 5,479,571 | * | 12/1995 | Parlos et al. ........................ 706/25 |
| 5,659,667 | * | 8/1997 | Buescher et al. ................... 706/23 |
| 5,812,992 | * | 9/1998 | De Vries ............................. 706/25 |
| 6,169,981 | * | 1/2001 | Werbos ................................ 706/23 |

OTHER PUBLICATIONS

Humphrey, W.S.; Singpurwalla, N.D., Predicting (individual) software productivity, Software Engineering, IEEE Transactions on, vol.: 17, Feb. 1991, pp: 196–207.*

Bishop, W.B.; Djuric, P.M.; Johnston, D.E., Bayesian Model Selection of Exponential Time Series Through Adaptive Importance Sampling, Statistical Signal and Array Processing., IEEE Seventh SP Workshop on, Jun. 26–29, 1994, pp: 51–54.*

Badri, M.A., Neural networks of combination of forecasts for data with long memory pattern, Neural Networks, 1996., IEEE International Conference on, vol.: 1, Jun. 3–6, 1996, pp: 359–364 vol. 1.*

Bittencourt, M.A.; Lin, F.C., Time series for currency exchange rate of the Brazilian Real, Computational Intelligence for Financial Engineering, 2000. (CIFEr) Proceedings of the IEEE/IAFE/INFORMS 2000 Conference on, Mar. 26–28, 2000, pp: 193–196.*

Singh, S.; Stuart, E., A pattern matching tool for time–series forecasting Pattern Recognition, 1998. Proceedings. Fourteenth International Conference on, vol.: 1, Aug. 16–20, 1998, pp: 103–105 vol. 1. Aug. 1988.*

(List continued on next page.)

*Primary Examiner*—Kakali Chaki
*Assistant Examiner*—Wilbert Starks
(74) *Attorney, Agent, or Firm*—Leonard Charles Suchyta

(57) ABSTRACT

A method and apparatus is disclosed for machine learning of a pattern sequence which is derived from a plurality of inputs. The pattern sequence is predicted from learning rate parameters that are exponentially related to an incrementally calculated gain parameter for each input. The gain parameter are increased or decreased in real time in correlation with the accuracy of the learning process. The disclosed method and apparatus are advantageously utilized in signal processing, adaptive control systems, and pattern recognition.

5 Claims, 3 Drawing Sheets

OTHER PUBLICATIONS

Komprej, I.; Zunko, P., Short term load forecasting, Electrotechnical Conference, 1991. Proceedings., 6th Mediterranean, May 22–24, 1991, pp: 1470–1473 vol. 2.*

Lee, H.B., Eigenvalues and eigenvectors of covariance matrices for signals closely spaced in frequency, Signal Processing, IEEE Transactions on, vol.: 40 10 , Oct. 1992, pp: 2518–2535, May 1991.*

Sorensen, O; "Neural Networks Performing System Identification for Control Applications"; Aalborg University; pp. 172–176.*

Sterzing, V.et al.; "Recurrent Nerual Networks for Temporal Learning Of Time Series"; IEEE; pp. 843–850, May 1993.*

Kesten, "Accelerated Stochastic Approximation," Annals of Mathematical Studies, vol. 29, 1958, pp. 41–49.

Jacobs, "Increased Rates of Convergence Through Learning Rate Adaptation," Neural Networks, vol. 1, 1988, pp. 295–307.

Chan et al., "An Adaptive Training Algorithm for Back Propagation Networks," Cambridge University Engineering Dept. Technical Report CUED/F–IN FENG/TR.2, 1987.

Lee et al., "Practical Characteristics of Neural Network and Conventional Pattern Classifiers on Artificial and Speech Problems," Advances in Neural Information Processing Systems, vol. 2, 1990, pp. 168–177.

Tollenaere, "SuperSAB: Fast Adaptive Back Propagation with Good Scaling Properties," Neural Networks, vol. 3, 1990, pp. 561–573.

Goodwin et al., "Adaptive Filtering Prediction and Control," Prentice Hall 1984. —Filed in 07/979, 139.

Silver et al., ILS: A system of Learning Distributed Heterogeneous Agents for Network Traffic Management, ICC'93, Geneva, 1993, pp. 1869–74.

* cited by examiner

METHOD AND APPARATUS FOR MACHINE LEARNING

RELATED APPLICATIONS

This application is a continuation of U.S. Ser. No. 08/979,139 filed on Nov. 20, 1992, now U.S. Pat. No. 5,946,675, by the same inventor as this application and assigned to the same assignee. Application Ser. No. 08/979,139 is a continuation-in-part of U.S. Ser. No. 07/947,213 filed on Sep. 18, 1992 by the same inventor as this application and assigned to the same assignee. Application Ser. No. 07/947,213 is now abandoned.

FIELD OF THE INVENTION

The current invention relates generally to a method and apparatus for machine learning of a pattern sequence and more particularly to a method and apparatus for machine learning of a pattern sequence utilizing an incrementally adjustable gain parameter.

BACKGROUND OF THE INVENTION

The task of learning by a machine a pattern sequence which is a linear function of multiple inputs is a central problem in many technical fields including adaptive control and estimation, signal processing, artificial intelligence, pattern recognition, and neural networking. The machine must perform responsive tracking of the pattern sequence in real time while achieving fast convergence in a computationally efficient manner. Often the process of learning the pattern sequence is made more difficult in that very little prior knowledge of the system generating the sequence is known. Moreover, while the inputs to the machine for learning the pattern may be identified, the relevance and weight of each input in affecting the output pattern sequence is usually not known.

Methods of determining the relevance of a particular input along with a specific weight are known. The weights are derived from a modifiable gain parameter. The gain parameter is modified based on the auto-correlation of the increments in the identified input. When the gain parameter is positively correlated with a certain average of the preceding input increments, the gain parameter is increased. Conversely if the input increments are negatively correlated the gain parameter is decreased. The gain parameters are adjusted to enhance the efficiency and responsiveness of the learning process.

Prior techniques for adapting the gain parameter of an adaptive learning process have been disclosed by Kesten in "Accelerated Stochastic Approximation", *Annals of Mathematical Studies*, Vol 29, 1958, pp 41–59. The Kesten method reduces gain parameters or moves them along a fixed schedule converging to zero. The method can not find a gain level appropriate to the dynamics of a non-stationary task and is limited to a single gain parameter for the entire system.

A method entitled Delta-Bar-Delta (DBD) for accelerating convergence of neural networks is disclosed by Jacobs in "Increased Rates of Convergence Through Learning Rate Adaptation", *Neural Networks*, vol. 1, 1988, pp 295–307, by Chan et al. in "An Adaptive Training Algorithm for Back Propagation Networks", Cambridge University Engineering Department Technical Report, CUED/F-INFENG/TR.2, 1987, by Tollenaere in "SuperSAB: Fast Adaptive Back Propagation with Good Scaling Properties", *Neural Networks*, vol. 3, 1990, pp. 561–573, by Devos et al. in "Self Adaptive Back Propagation", Proceedings NeuroNimes, 1988, EZ, Nanterre, France, and by Lee et al. in "Practical Characteristics of Neural Network and Conventional Pattern Classifiers on Artificial and Speech Problems", *Advances in Neural Information Processing Systems*, vol. 2, 1990, pp 168–177. These DBD methods do not operate incrementally and are not dynamic. The methods modify the gain parameters after a complete pass through the training set and thus can not be applied to an on-line learning situation.

Classical estimation methods including the Kalman filter, Least-Squares methods, Least-Mean-Squares (LMS), and normalized LMS are described by Goodwin et al. in *Adaptive Filtering Prediction and Control*, Prentice Hall, 1984. These methods can be divided into classes with differing disadvantages. The Kalman filter method offers optimal performance in terms of tracking error, but requires more detailed knowledge of the task domain than is usually available. In particular, it requires complete knowledge of the statistics of the unknown system's time variation. The least-squares methods requires less such knowledge, but does not perform as well. In addition, both of these methods require a great deal of memory and computation. If the primary learning process has N parameters, then the complexity of these methods is of the order of $N^2$. That is, their memory and computational requirements increase with the square of the number of parameters being estimated. In many applications this number is very large, making these methods undesirable. The LMS and Normalized LMS methods are much less complex, requiring memory and computation that is only of order N. However, these methods have slow convergence.

Thus it is desirable to discover a method of machine learning that achieves fast convergence and has responsive tracking of a pattern sequence without excessive computation, system knowledge, or intervention in a real time system.

OBJECTS OF THE INVENTION

Accordingly, it is a primary object of this invention to obviate the above noted and other disadvantages of the prior art.

It is a further object of the invention to provide a novel machine apparatus for detecting and learning pattern sequences.

It is a yet further object of the invention to provide a novel method apparatus for detecting and learning pattern sequences.

SUMMARY OF THE INVENTION

The above and other objects and advantages are achieved in one aspect of this invention with a method and apparatus for machine learning of a pattern sequence using an incrementally adaptive gain parameter to adjust the learning rate of the machine. The machine receives a plurality of inputs that may correspond to sensor information or the like and predicts the pattern sequence from past experience and the input values. Each input has associated with it an individual gain parameter and learning rate. The gain parameters are increased or decreased in real time in correlation with the accuracy of the learning process.

In one aspect of the invention, the pattern sequence is predicted utilizing a weighted linear combination of the inputs. The particular weights are derived from the individual learning rates of the inputs and the associated gain parameters.

The disclosed method and apparatus are advantageously utilized in signal processing, adaptive control systems, and pattern recognition.

DETAILED DESCRIPTION OF THE INVENTION

For a better understanding of the present invention, together with other and further objects, advantages, and capabilities thereof, reference is made to the following disclosure in conjunction with the accompanying drawings.

Figure 1:
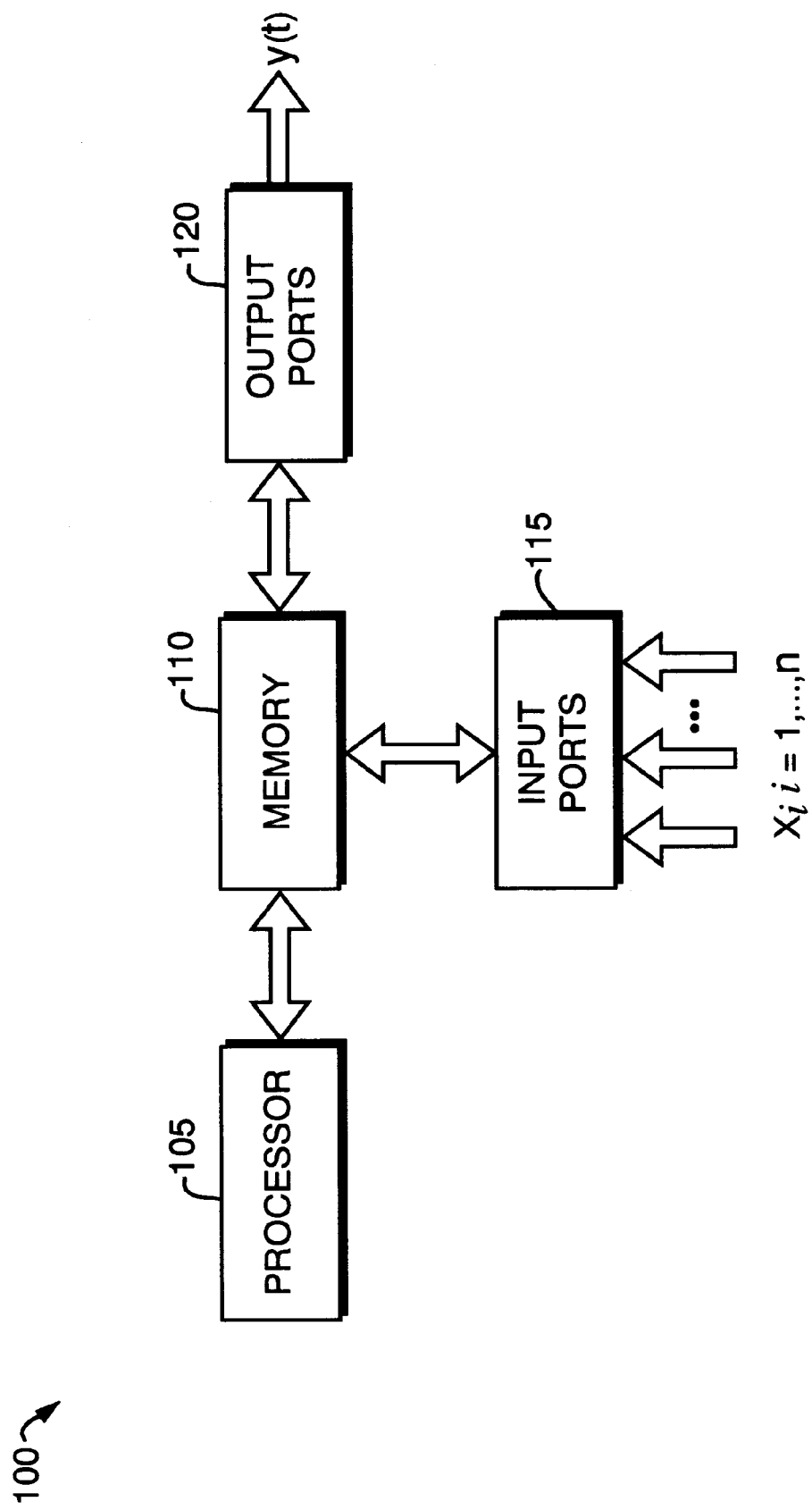
FIG. 1 is an illustration of a computer system that embodies the learning machine in accordance with the current invention.

In one embodiment of the current invention, a programmable computer system is utilized as the machine apparatus to perform the learning process. As shown in FIG. 1, the computer system 100 has a processor 105 for executing instructions that employ the disclosed method of machine learning, a memory 110 for storing data, input ports 115 for receiving information to be processed by the processor 105, and an output port 120 for making the results of processor 105 available. Typically computer system 100 is an adaptive signal processing system or a adaptive control system wherein input ports 115 receive sensor information and output port 120 is used to control a physical process. The machine apparatus is also advantageously utilized in pattern recognition applications.

Figure 2:
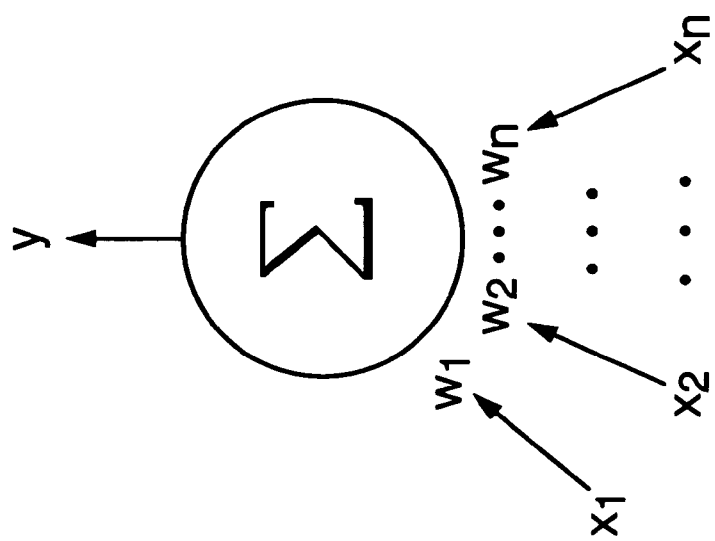
FIG. 2 is a depiction of the linear combination of the weighted inputs to produce the output result.

The method of machine learning disclosed herein is a meta-learning technique in the sense that it learns the learning-rate parameters of an underlying base learning system. The base learning system is an approximation to the Kalman filter with reduced computational complexity. This learning process is often thought of as a single connectionist unit as shown in FIG. 2. The unit is linear, meaning that the predicted value of the pattern sequence y(t), at each time step t, is a weighted sum of its real-valued inputs $x_i(t)$:

$$y(t) = \sum_{i=1}^{n} w_i(t)x_i(t), \quad (1)$$

were each $w_i(t)$ is the value at time t of a modifiable weight $w_i$ associated with $x_i$. It is understood in the disclosure that follows that the index i refers to the parameter associated with the input $x_i$. At each time step, the machine 100 receives a set of inputs on input ports 105, $x_i(t)$, computes its output in processor 105, y(t), and compares it to a given desired result, $y^*(t)$. The aim of the machine learning is to minimize the squared error $\delta^2(t)$, where $\delta(t)=y^*(t)-y(t)$, on future time steps. The approximate Kalman filter learning rule updates the weights at each time step according to:

$$w_i(t+1) = w_i(t) + \alpha\delta(t)x_i(t) \Big/ \left(R + \sum_{j=1}^{n} \alpha x_j^2(t)\right)$$

where $\alpha$ is a positive constant called the learning rate, and R is an estimate of the variance of the noise in $y^*$ (R is typically taken to be 1).

The present invention utilizes a single linear unit using the above rule as a basis. However for the present invention, there is a different learning rate, $k_i$, for each input $x_i$, and these change according to a meta-learning process. The present invention is named the K1 method. The base-level learning rule is $$w_i(t+1)=w_i(t)+k_i(t)\delta(t) \quad (3)$$

The learning rates are a powerful form of bias in this system. Learning about irrelevant inputs acts as noise interfering with learning about relevant inputs. In effect, learning rates are a valuable resource that must be allocated carefully. Inputs that are likely to be irrelevant should be given small learning rates, whereas inputs that are likely to be relevant should be given large learning rates.

In the present invention, the learning rates are all of the form $$k_i(t) = x_i(t)e^{\beta_i(t)} \Big/ \left(R + \sum_{j=1}^{n} x_j^2(t)e^{\beta_j(t)}\right)$$

where R is typically equal to 1.

The $\beta_i$ are updated by the following rule:

$$\beta_i(t+1)=\beta_i(t)+\theta\delta(t)x_i(t)h_i(t), \quad (5)$$

where $\theta$ is a positive constant denoted the meta-learning rate, and $h_i$ is an additional per-input memory parameter updated by $$h_i(t+1)=[h_i(t)+k_i(t)\delta(t)][1-k_i(t)x_i(t)]^+ \quad (6)$$

where $[x]^+$ is defined as x for x>0, else 0. The memory $h_i$ is a decaying trace of the cumulative sum of recent changes to $w_i$.

The intuitive idea behind the current K1 method of machine learning is that the increment to $\beta_i$ in (5) is proportional to the product of the current weight change, $\delta(t)x_i(t)$, and a trace of recent weight changes, $h_i(t)$. By accumulating this product, the overall change in $\beta_i$ becomes proportional to the correlation between current and recent weight changes. If the current step is positively correlated with past steps, that indicates that the past steps should have been larger (and equation (5) accordingly increases $\beta_i$). If the current step is negatively correlated with past steps, that indicates that the past steps were too large; the K1 method is overshooting the best weight values and then having to re-correct in the opposite direction (here equation (5) decreases $\beta_i$).

The best learning rate will have been found when weight updates are uncorrelated with preceding updates.

The K1 method as described above is similar to Jacobs' Delta-Bar-Delta algorithm as described in his 1988 publication. However, Jacobs' method can be applied only on a batch-by-batch basis, with updates after a complete presentation of a training set, whereas here we assume examples arrive one-by-one and are not necessarily revisited afterwards. The K1 method is incremental in that the trace $h_i$ is defined such that it fades away only to the extent that the corresponding input $x_i$ is present, as indicated by $x_i^2(t)$. The K1 method also improves over Jacobs' in that the decay rate is not a separate free parameter, but is tied to the current learning rate. The new K1 method in fact has only one free parameter, the meta-learning rate, θ, whereas Jacobs' method has three free parameters.

The steps of the K1 method are as follows:
Initialize $h_i$ to 0, and $w_i$, $\beta_i$ as desired, i=1, ... ,n
Repeat for each new example ($x_1, \ldots , x_n, y^*$):
  calculate:

$$y = \sum_{i=1}^{n} w_i x_i$$

calculate:

$$\delta = y^* - y$$

Repeat for $i = 1, \ldots, n$:
  calculate:

$$\beta_i = \beta_i + \theta \delta x_i h_i$$

$$k_i(t) = x_i(t)e^{\beta_i(t)} \bigg/ \left(R + \sum_{j=1}^{n} x_j^2(t)e^{\beta_j(t)}\right)$$

$$w_i(t+1) = w_i(t) + k_i(t)\delta(t)$$

$$h_i(t+1) = [h_i(t) + k_i(t)\delta(t)][1 - k_i(t)x_i(t)]^+.$$

In practice, it is often useful to bound each $\beta_i$ from below by, say, −10, to prevent arithmetic underflows. In addition, it is prudent to limit the change in $\beta_i$ on any one step to, say, ±2. However, this bounding is not required to obtain the empirical results presented in the next section.

EXAMPLE

The capabilities of the instant K1 method for a linear combination of inputs were assessed using a series of tracking tasks—supervised-learning or concept-learning tasks in which the target concept drifts over time and is to be tracked. Non-stationary tasks are more appropriate here than conventional learning tasks because we are trying to assess the K1 method's ability to learn biases during early learning and then use them in later learning. To study this one needs a continuing learning problem, not one that can be solved once and is then finished.

The task involved 20 real-valued inputs and one output. The inputs were chosen independently and randomly according to a normal distribution with mean zero and unit variance. The target concept was the sum of the first five inputs, each multiplied either by a weight, i.e.

$$y^* = s_1 x_1 + s_2 x_2 + s_3 x_3 + s_4 x_4 + s_5 x_5 + 0 x_6 + 0 x_7 + \ldots + 0 x_{20},$$

where all the $s_i$ are continuous values initially zero. To make it a tracking problem, on every example a number selected independently with normal distribution was added to the 5 weights $s_1, \ldots , s_5$. Further, noise was introduced in $y^*$ with the variance R. Thus, the same five inputs were always relevant, but their relationship to the target concept changed slowly.

The K1 method's performance was tested versus the LMS (Least Mean Squares) method, the NLMS (Normalized Least Mean Squares), the Kalman filter, and the IDBD method described in the application identified at the beginning of this application. Because this is a tracking task, it suffices to perform one long run and measure the asymptotic tracking performance of the competing methods.

All of the tested methods were run for 20,000 examples so as to get past any initial transients, and then ran another 10,000 examples. The average mean-squared error over that 10,000 examples was used as the asymptotic performance measure of the method. The methods used were ordinary LMS, the NLMS (Normalized Least Mean Squares), the Kalman filter, and the IDBD method and the instant K1 method, all with a range of learning or meta-learning rates. The $\beta_i$ in the currently disclosed K1 method were set initially such that $e^{\beta_i(0)}=1$ for all i.

Figure 3:
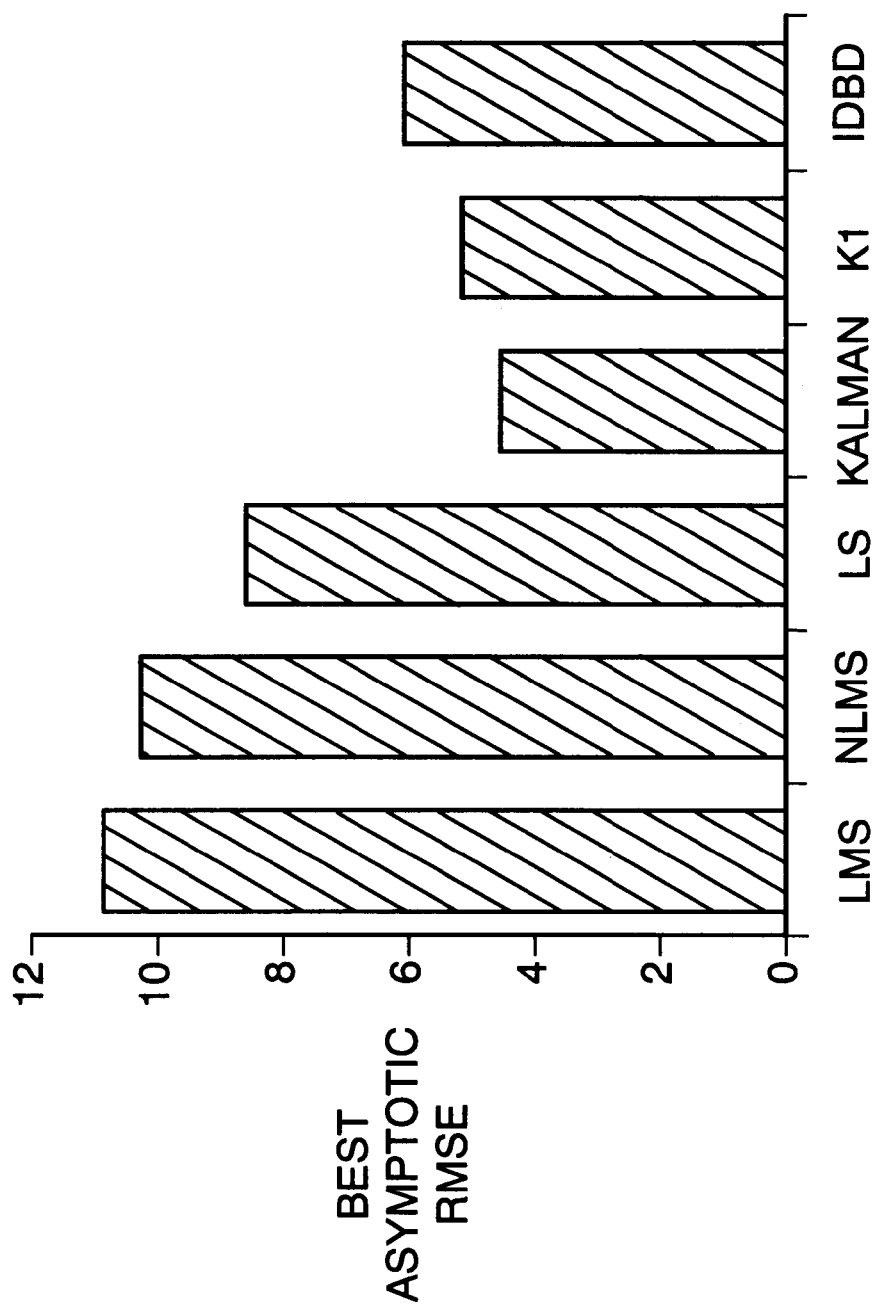
FIG. 3 is a graphical comparison of performance among alternative methods of machine learning.

The results of this performance evaluation are summarized in FIG. 3. FIG. 3 illustrates a comparison of the average asymptotic performances of the tested methods. As can be seen the Kalman filter is best in terms of asymptotic error, but the method requires special apriori knowledge that the other alternative methods do not require. The K1 method outperforms the other tested methods and approaches the performance of the Kalman filter.

TABLE 1

Approximate computational complexity of the algorithms

| Algorithm | Memory | Adds & Mults |
|---|---|---|
| LMS | n | 4n |
| NLMS | n | 6n |
| IDBD | 3n | 13n |
| K1 | 3n | 17n |
| LS | ½n² + n | 2.5n² + 8.5n |
| Kalman | ½n² + n | 2.5n² + 8.5n |

TABLE 1 lists the approximate computational complexity of the tested methods. The K1 method has a computational complexity of order n while the Kalman filter is of order $n^2$. It is also noted that although the K1 method outperforms the IDBD method it is computationally more complex and thus more difficult to implement.

While there has been shown and described what is at present considered the preferred embodiment of the invention it will be obvious to those skilled in the art that various changes and modifications may be made therein without departing from the invention as defined by the appended claims.

What is claimed is:

1. A computer system for determining a time dependent pattern sequence y(t), comprising:
  a memory configured to store instructions; and
  a processor configured to execute the instructions to receive a plurality of time dependent inputs $x_i(t)$ and a meta-step-size parameter θ, determine a predicted value of the pattern sequence y(t) from the time dependent inputs based on a learning rate $\alpha_i$ that is exponentially related to an incremental gain $\beta_i(t)$, the incremental gain $\beta_i(t)$ being derived from previous values of $\beta_i(t)$,
  store the predicted value of the pattern sequence y(t) in the memory, and determine the pattern sequence y(t) using the stored predicted value.

2. The computer system of claim 1, wherein the predicted value of the pattern sequence is calculated as a linear combination of the plurality of time dependent inputs.

3. The computer system of claim 1, wherein the derivation means derives the incremental gain $\beta_i(t)$ according to the rule:

$$\beta_i(t+1)=\beta_i(t)+\theta\delta(t)x_i(t)h_i(t),$$

where $\theta$ is a positive constant denoted as the meta-learning rate, and $h_i$ is an additional per-input memory parameter updated by $$h_i(t+1) = h_i(t)[1 - \alpha_i(t+1) x_i(t)]^+ + \alpha_i(t+1) \delta(t) x_i(t),$$

where $[x]^+$ is defined as x for x>0, else 0.

4. The computer system of claim 1, wherein the predicted value of the pattern sequence is calculated as a non-linear combination of the plurality of time dependent inputs.

5. The computer system of claim 1, wherein the derivation means derives the incremental gain $\beta_i(t)$ according to the rule:

$$\beta_i(t+1) = \beta_i(t) + \theta.$$

* * * * *